United States Patent [19]

Jensen

[11] Patent Number: 4,650,452
[45] Date of Patent: Mar. 17, 1987

[54] METHOD FOR JOINING A TUBE TO A COLLECTION POUCH

[75] Inventor: Ole R. Jensen, River Vale, N.J.

[73] Assignee: Squibb Corporation, Princeton, N.J.

[21] Appl. No.: 859,185

[22] Filed: Apr. 28, 1986

Related U.S. Application Data

[62] Division of Ser. No. 727,927, Apr. 29, 1985, abandoned.

[51] Int. Cl.⁴ .................. B31B 19/64; B31B 19/84
[52] U.S. Cl. .................................... 493/206; 493/213; 383/904; 383/906; 604/408; 222/107; 222/573
[58] Field of Search .................. 383/127, 906, 904; 604/408, 415; 222/107, 573; 473/189, 206, 212, 213; 53/410, 479

[56] References Cited

U.S. PATENT DOCUMENTS

| Re. 25,129 | 2/1962 | Waller | 604/408 X |
|---|---|---|---|
| 3,007,608 | 11/1967 | Cox | 53/410 |
| 3,193,180 | 7/1965 | Lissner | 493/213 |
| 3,217,710 | 11/1965 | Beall et al. | 604/408 |
| 3,270,790 | 9/1966 | Clark | 383/24 X |
| 3,304,977 | 2/1967 | Hammons | 383/904 X |
| 4,069,748 | 1/1978 | Frank | 493/213 |
| 4,119,128 | 10/1978 | Bishop | 206/807 X |
| 4,240,482 | 12/1980 | Andersson et al. | 604/408 X |
| 4,394,204 | 7/1983 | Hutcheson | 156/275.1 |
| 4,465,487 | 8/1984 | Nakamura et al. | 604/408 |
| 4,484,904 | 11/1984 | Fowler | 493/213 |

FOREIGN PATENT DOCUMENTS

| 883556 | 10/1971 | Canada | 493/213 |
|---|---|---|---|
| 1411850 | 10/1968 | Fed. Rep. of Germany | 493/213 |

Primary Examiner—Frederick R. Schmidt
Assistant Examiner—William E. Terrell
Attorney, Agent, or Firm—James & Franklin

[57] ABSTRACT

A rigid, hollow cylindrical insert is designed to be located and to remain in the end portion of a deformable plastic tube. The end portion of the tube is situated between thin film layers with the insert aligned with an edge to be sealed. The assembly is placed between the mating pressure dies to be welded. In a single operation, the edges of the layers are sealed to form a pouch as the tube end portion is welded to the layers along the seam at the top of the pouch. The insert supports the tube end portion in a non-deformed state during welding. This permits an effective weld to be obtained with tubes of various structures and, particularly, very soft tubes such as ones with thin walls composed of polyvinylchloride.

2 Claims, 3 Drawing Figures

METHOD FOR JOINING A TUBE TO A COLLECTION POUCH

This application is a divisional of co-pending U.S. patent application Ser. No. 727,927 filed Apr. 29, 1985 and entitled "Tube Insert For Pouch Weld now abandoned."

The present invention relates to a method for joining a plastic tube to a pouch or the like and, more particularly, to a tube insert which permits thinner walled, softer plastic tubes to be effectively welded to pouches or bags, and the method of manufacture employing the tube insert.

Many types of medical devices, such as urine collection devices, include a tube connected to a collection pouch or bag. The pouch or bag is often adapted to be attached to the leg of the patient with the connecting tube extending along the leg of the patient to the collection pouch.

It is desirable that the connecting tube be as soft and flexible as possible. A softer, more flexible tube is more comfortable and offers less resistance to the movement of the patient. In addition, such a tube is less likely to kink, causing an obstruction through which liquid cannot pass.

It is also necessary that the tube be affixed to the pouch or bag in a manner which provides a physically secure, fluid-tight seal. In order to achieve the necessary seal, radio frequency or heat welding are often utilized, depending upon the materials involved. In particular, heat welding is employed for polyethylene, whereas radio frequency welding is used for polyvinylchloride.

Normally, the welding procedure takes place within an openable pair of mating pressure dies or jaws between which the tube-pouch assembly is received. The end portion of the tube is inserted between the walls along the edge of the pouch, prior to insertion of the assembly between the dies. As the dies close, the assembly is subjected to pressure, causing the exterior surface of the tube to be deformed or "pinched." This occurs as small amounts of tube material accumulate at opposite points on the exterior surface of the tube, where the die surfaces meet. The deformation of this material, in conjunction with heat or RF energy imparted by the dies, results in a bond between the pouch walls and the exterior surface of the tube at the points where the accumulated material is present.

If the material from which the tube is composed is a relatively hard material, such as polyethylene, it is difficult to control the tube deformation in order to obtain sufficient amounts of material from the exterior surface of the tube at the points along the die surfaces for a proper weld to be achieved. On the other hand, if the tube is made of material which is relatively soft, such as polyvinylchloride (PVC), or if the walls thereof are too thin, the end portion of the tube may deform to an undesirable extent, such that it is no longer adjacent the die surfaces. This also results in an inadequate weld.

One possible way of overcoming the difficulties associated with welding thin-walled tubes or tubes of soft plastic material is to use a solid cylindrical mandrel made of brass or the like to support the tube during the welding process. Since the tube is generally several feet long, it is not practical to insert the mandrel into the free end and snake it through the entire length of the tube to the end to be welded. Therefore, the welding process must be performed in two separate steps.

First, a short tube segment, usually only a few inches long, is inserted over the mandrel. The segment is welded to the pouch walls with the mandrel in position. After the segment is welded, the mandrel is withdrawn. The remainder of the tube must then be affixed to the welded tube segment in a separate operation. This can be achieved by, for example, welding interengageable connectors to the ends of the tube and the segment, or by forming a seal in some other manner.

The above process is relatively expensive to perform. Moreover, it requires two separate connections where only one is desired, greatly increasing the possibility of an improper connection.

It should be appreciated that the type of medical apparatus here under discussion is normally considered to be disposable. It must therefore be made of inexpensive materials which can be assembled quickly using conventional equipment. The use of a two-step welding process, particularly if interengageable connectors are required, is thus contraindicated.

It is, therefore, a prime object of the present invention to provide a tube insert for a pouch weld which permits softer, thinner walled tubes to be securely welded to a pouch or a bag.

It is another object of the present invention to provide a tubular insert for a pouch weld in which a relatively short non-removable insert is utilized to support the tube wall in a non-deformed condition during the welding operation.

It is another object of the present invention to provide a tube insert for a pouch weld wherein the insert is of any relatively rigid material such as steel or polyethylene and can be inserted easily into the tube end prior to welding.

It is another object of the present invention to provide a tube insert for a pouch weld which will permit the use of thin walled tubes made of polyvinylchloride.

It is another object of the present invention to provide a tubular insert for a pouch weld in which the necessity for the use of a withdrawable mandrel is eliminated.

It is another object of the present invention to provide a tubular insert for a pouch weld in which the welding process is simplified.

It is another object of the present invention to provide a tubular insert for a pouch weld which results in a disposable device composed of inexpensive parts assembled on conventional equipment using simple techniques.

In accordance with one aspect of the present invention, a tube and pouch combination is provided. The tube comprises a relatively deformable hollow body having an inner diameter and an end portion. The pouch comprises first and second walls joined along an edge, except at an opening into which the end portion is received. A hollow tubular insert is non-removably mounted within the end portion. The insert has an outer diameter substantially equal to the inner diameter of the tube end portion. The insert is rigid and supports the end portion in a relatively non-deformed condition as the end portion and the pouch are welded together.

The insert preferably comprises a pointed end. The pointed end facilitates insertion of the insert into the end portion. The insert is approximately one inch long and, thus, can be easily inserted into the tube to a suitable depth.

The walls of the tube are preferably approximately in the range of 0.5 to 1.0 millimeter thick. The tube is preferably composed of soft plastic, such as polyvinylchloride (PVC), but other plastics may also be used. The walls of the pouch are preferably composed of the same material as the tube.

In accordance with another aspect of the present invention, a method is provided for joining the end portion of a relatively long, deformable tube to a pouch or the like. The welding takes place in a tool of the type having mating pressure dies. The method comprises the steps of non-removably inserting a hollow tubular member into the tube end portion. The member is composed of rigid material and functions to support the tube end portion in a relatively non-deformed condition during welding. The end portion is situated between the walls of the pouch in alignment with the seam to be formed. The tube-pouch assembly is then placed between the die members. The dies are closed and energy applied to seal the edges of the walls of the pouch and weld the exterior surface of the tube end portion therebetween.

The step of inserting preferably comprises the steps of forming a pointed leading edge on one end of the member and inserting the pointed leading edge within the tube end.

To these and to such other objects which may hereinafter appear, the present invention relates to a tube insert for a pouch weld or the like, as described in detail in the following specification, and recited in the annexed claims, taken together with the accompanying drawings, wherein like numerals refer to like parts, and in which:

Figure 1:
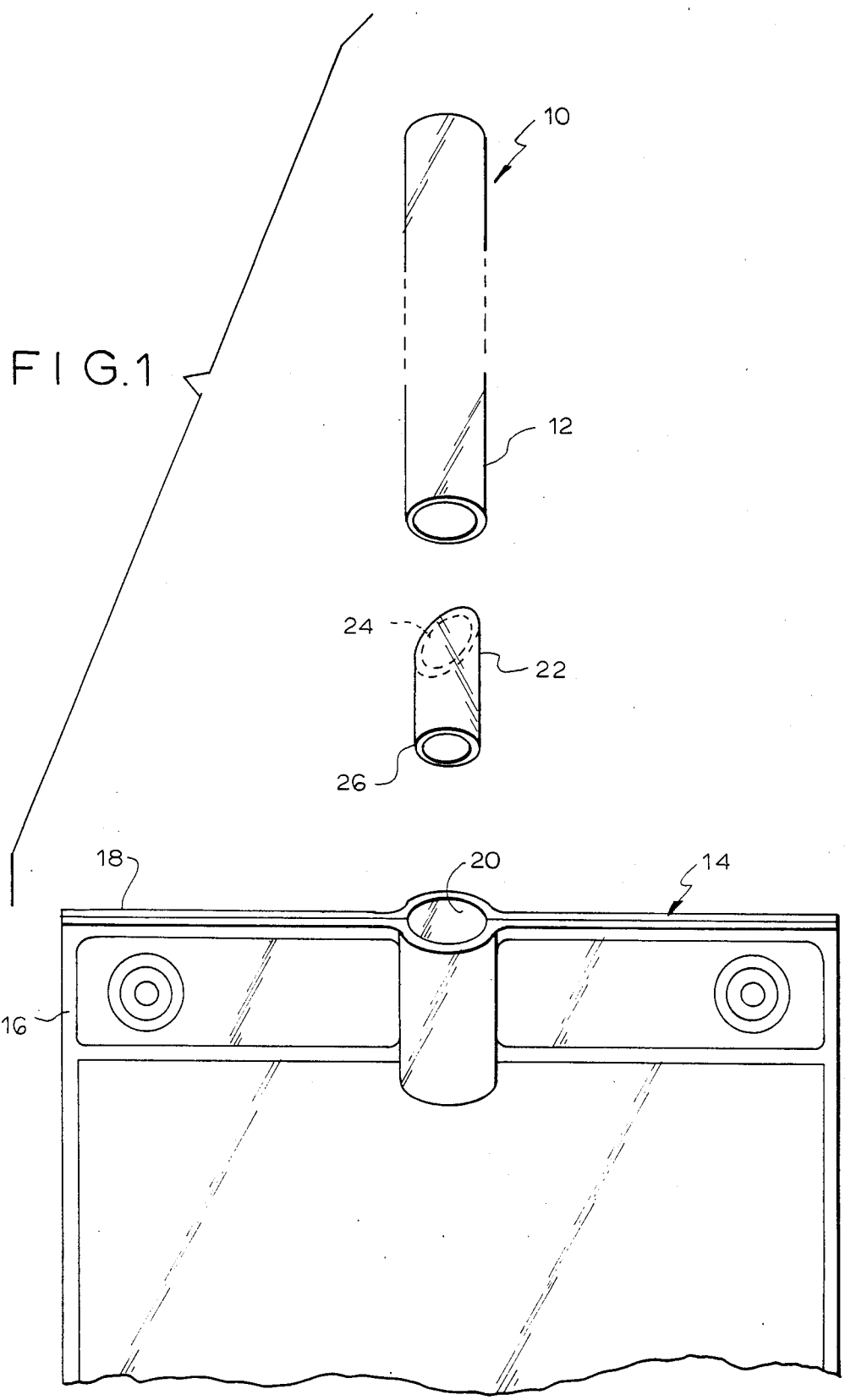
FIG. 1 is an exploded isometric view illustrating the tube insert of the present invention and the manner in which same is mounted.

As shown in FIG. 1, the present invention includes a tube 10 in the form of a relatively long hollow body composed of a deformable plastic material. The material is preferably polyvinylchloride, but other plastic compositions may also be employed. The walls of tube 10 are relatively thin, preferably within the range of 0.5–1.0 mm. thick. One end portion 12 of tube 10 is to be welded to a plastic bag or pouch 14. Pouch 14 is formed by sealing the peripheral edges of first and second layers of thin film 16, 18. Layers 16, 18 are also made of plastic, preferably, the same plastic material as tube 10.

As the peripheral edges of layers 16 and 18 of the pouch are sealed together, tube end portion 12 will be sealed therebetween within an opening 20, at the top of pouch 14. Prior to insertion between layers 16, 18, tube end portion 12 is provided with an insert 22. Insert 22 has a hollow tubular or cylindrical configuration and can be composed of any relatively rigid material such as polyethylene, steel, or the like. The insert is relatively short in length, preferably approximately an inch. Insert 22 has a leading edge 24 which is cut at a bias or an incline with respect to the axis of the insert, so as to form a point and a trailing edge 26 which is cut in a plane generally perpendicular to the axis of the insert. Inclined leading edge 24 facilitates the insertion of insert 22 into tube end 12.

Figure 2:
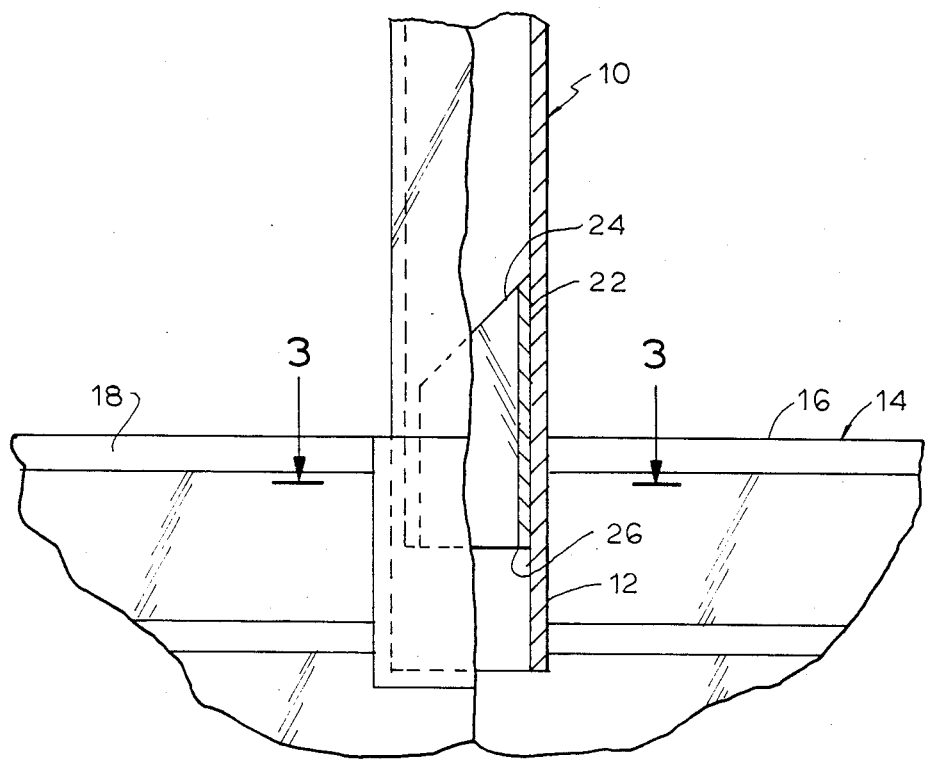
FIG. 2 is a partially cut-away side view of a portion of the tube-pouch assembly of the present invention situated in the welding tool.

As illustrated in FIG. 2, insert 22 is lodged flush with end of portion 12 or a short distance from the end of portion 12. The depth to which the leading edge 24 of insert 22 is inserted within end portion 12 will be determined by the length of insert 22. The insert must align with the seam to be formed between layers 16 and 18, along the top of pouch 14.

Figure 3:
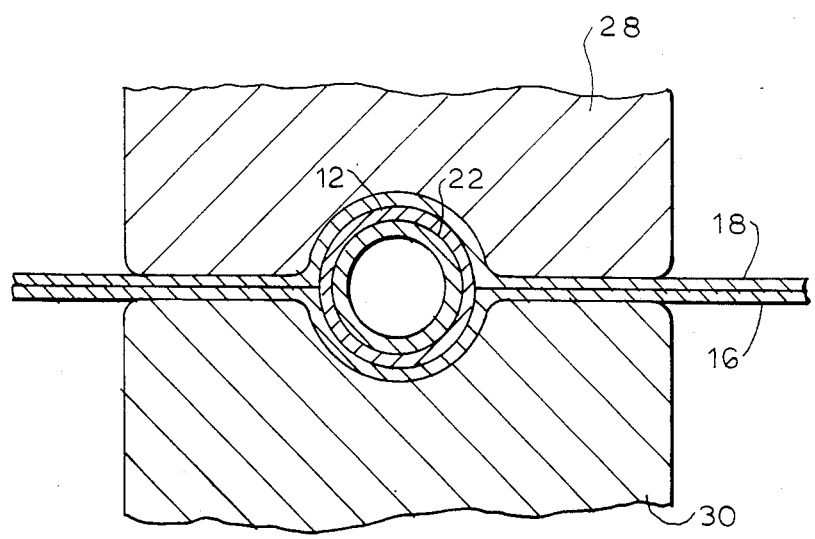
FIG. 3 is a top view taken along line 3—3 of FIG. 2.

After the insert 22 is received within tube end portion 12 and end portion 12 is located between layers 16 and 18, the tube-pouch assembly is placed between a pair of mating pressure dies or welding jaws 28, 30, as illustrated in FIGS. 2 and 3. Mating dies 28 and 30 are closed tightly so as to provide the necessary pressure for the welding operation. Radio frequency (RF) or heat energy is applied through the dies 28 and 30 to the assembly such that the seam along the edges of the pouch is formed and end portion 12 is sealed between the top edge of layers 16 and 18. After the welding operation is complete, mating dies 28 and 30 are opened and the assembly removed.

As can best be seen from FIG. 3, rigid insert 22 supports the walls of tube end portion 12 in a substantially non-deformed state when pressure is applied thereto by dies 28 and 30 during the welding process. Accordingly, a physically secure, fluid-tight seal is achieved between the exterior surface of tube end portion 12 and the interior surfaces of layers 16 and 18.

Insert 22 is not removed, but remains within tube end portion 12. Normally, the outer diameter of insert 22 is selected such that a tight friction fit is achieved between the exterior surface of insert 22 and the interior surface of tube end portion 12. This friction fit will prevent insert 22 from being displaced within the tube. However, if desirable, insert 22 can be affixed to the interior surface of end portion 12 by means of an adhesive or the like.

It will now be appreciated that the present invention relates to a tube insert for a pouch weld which permits the welding of relatively soft, thin-walled plastic tubes to plastic pouches and bags, or the like. The insert is non-removably received within the end portion of the tube which is then inserted between the edges of the layers of the pouch. As the welding operation takes place, the insert supports the tube end portion in a substantially non-deformed state such that a physically secure fluid-tight seal can be achieved in a single welding operation. It should also be appreciated that conventional RF or heat welding equipment can be utilized.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

I claim:

1. A method of forming a pouch and tube combination comprising first and second walls having peripheral edge portions, a relatively deformable tube having an end portion, and a relatively rigid hollow tubular member, the method comprising the steps of:
   (a) inserting said member into said end portion;
   (b) locating said end portion between said walls with said member aligned with the peripheral edge portions thereof;
   (c) placing the end portion, member, and peripheral portion assembly between mating pressure dies of a welding tool; and
   (d) applying pressure and energy through the dies and thereby welding said peripheral edge portions of the walls together and to the exterior surface of the end portion of the tube, as the member supports the end portion in a relatively non-deformed state, thereby forming a substantially permanent assembly of said pouch, tube and member.

2. The method of claim 1, wherein said member has an inclined leading edge, and said step of inserting comprises the step of causing said leading edge to be received in the member.

* * * * *

UNITED STATES PATENT AND TRADEMARK OFFICE
CERTIFICATE OF CORRECTION

PATENT NO. : 4,650,452
DATED : March 17, 1987
INVENTOR(S) : Ole R. Jensen

It is certified that error appears in the above—identified patent and that said Letters Patent is hereby corrected as shown below:

Front Page Assignee should read:

E.R. SQUIBB & SONS, INC.

Signed and Sealed this

Twenty-fifth Day of August, 1987

*Attest:*

*Attesting Officer*

DONALD J. QUIGG

*Commissioner of Patents and Trademarks*